Dec. 8, 1931.    W. I. NEVIUS    1,835,963
HIGH PRESSURE JOINT
Filed May 4, 1928
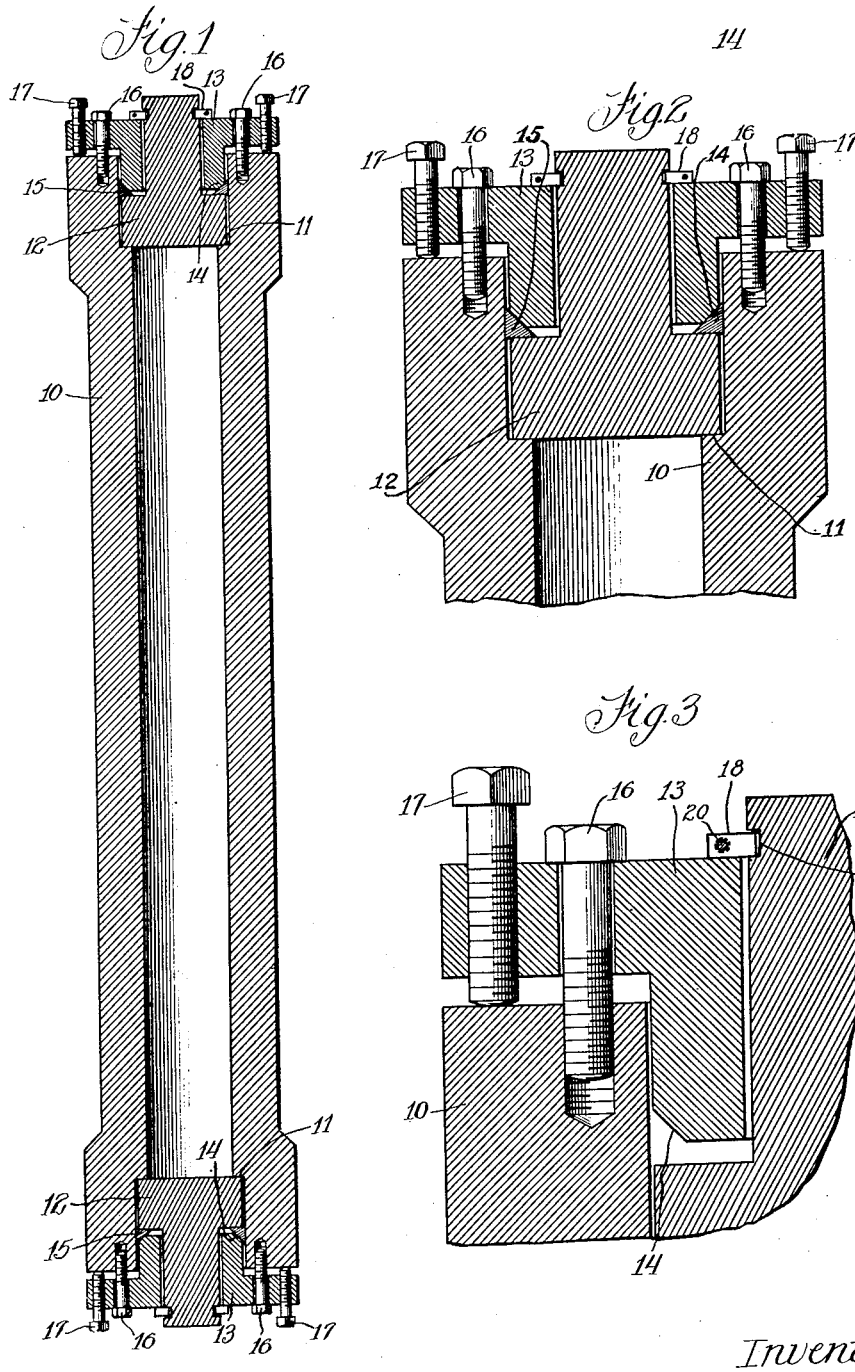
Inventor:-
Walter I. Nevius Patented Dec. 8, 1931

1,835,963

UNITED STATES PATENT OFFICE

WALTER I. NEVIUS, OF PEORIA, ILLINOIS, ASSIGNOR TO COMMERCIAL SOLVENTS CORPORATION, OF TERRE HAUTE, INDIANA, A CORPORATION OF MARYLAND

HIGH PRESSURE JOINT

Application filed May 4, 1928. Serial No. 275,077.

The present invention relates to joints, and more particularly to joints in connection with high pressure vessels such as those used in pressure processes for the synthesis of ammonia from nitrogen and hydrogen, and it has for its object to provide an arrangement whereby an efficient joint is secured throughout substantially the entire life of the apparatus and in which the internal pressure is utilized to tighten the joint and to make the same gas tight, while permitting a relatively quick and easy dismantling of the apparatus. Other more specific objects will appear from the description which follows hereafter.

The adaption of the invention to the production of synthetic ammonia is described and illustrated merely by way of example and without defining the limits of the invention. In the drawings, Fig. 1 is a diagrammatic longitudinal section of an ammonia converter embodying the present invention, Fig. 2 is a diagrammatic fragmentary sectional view on an enlarged scale of an end of the converter shown in Fig. 1, Fig. 3 is a diagrammatic fragmentary sectional view of the end of Fig. 2, enlarged to show the manner of fitting the gasket.

In the drawings 10 represents a shell capable of resisting high internal pressures. This shell 10 is provided at opposite ends with the interior annular shoulders 11, each of which is adapted to receive a head 12 to form a seat therefor. Each head 12 is retained in position by the retaining ring 13, this ring being provided with a chamfered surface 14, preferably having a tapering surface, the surface 14 thereby defining an annular tapering recess between the retaining ring 13 and the shell 10. In the assembled condition of the apparatus, a gasket 15 of soft metal, such as copper, and conveniently substantially triangular in shape, is fitted into this annular recess, being in engagement with the chamfered surface 14, head 12, shell 10.

In practice, when the device is assembled, a plurality of screws, 16, is provided to hold the ring 13 in place, the ring 13 and the shell 10 being suitably recessed to receive these screws. Pressure exerted upon the screws 16, forces the ring 13 against the gasket 15, the gasket being securely held in place by the chamfered edge 14 of the ring 13, the chamfered edge defining a groove in which the gasket 15 is placed and held in position by the said chamfered edge 14. Any internal pressure, which is generated within the shell 10, being effective against the head 12, will tend to force the same outwardly, which tendency is resisted by the retaining ring 13. This pressure acting outwardly opposes the pressure exerted upon the ring by the screws 16, and these screws will act to retain the ring firmly in position and to prevent any deformation thereof. There is also provided a plurality of screws 17, passing through the ring 13, and engaging the top of the shell. When it is desired to remove the head 12, the screws 17, are tightened, this action raising the ring 13. The head 12 is provided with an annular groove in which there is placed a split ring 18, usually of steel. The groove, indicated at 19, serves as a locking means to retain the ring 18 in its position. As shown on the drawings, one segment of the ring 18 is presented, the segments or sections of the ring being connected by the bolts 20.

With the illustrated and described arrangement, the combined effect of the internal pressure within the shell 10 and the resistance offered by the retaining ring 13, is that of pressure exerted upon the copper gasket 15, which, being confined on all sides, flows in such a manner that it fits exactly into the recess between the ring and the shell and against the head 12 and thus provides an absolutely gas or fluid tight connection. It will be seen that the construction according to the present invention permits the ready dismantling of the apparatus and prevents the jamming of the head when the same is removed.

In practice, it will be found desirable to thicken the retaining ring at the gasket in such a manner as to take care of the horizontal component of the forces which are set up through the action of the pressure generated within the shell.

If desired, the joint may be protected from dust and other foreign materials in any suitable manner, as will become apparent to anyone skilled in this art. The invention is applicable to apparatus of any size, and the joint retains its effectiveness indefinitely and under fluctuating operating conditions. The gasket, being confined on all sides, is prevented from becoming deformed in such a manner as to result in loss of efficiency.

It will be understood that it is desired to embrace within the scope of this invention such changes or modifications as may be necessary to adapt it to varying conditions and uses.

What is claimed is:

1. The combination with a shell in which high pressure is normally existent and having an internal annular shoulder, of a head adapted to engage the shoulder and being exposed to the action of the pressure in the said shell and slightly movable outwardly under pressure, a retaining ring adapted to retain the head in position, the said ring being tapered inwardly to provide an annular recess between the ring and the shell, and a soft metal gasket in the said recess engaging the ring, the head and the shell, and arranged to be expanded by the taper of the ring and the action of the internal pressure upon the said head, to form a fluid tight connection.

2. The combination with a shell in which high pressure is normally existent and having an internal annular shoulder, of a head adapted to seat upon the shoulder and being exposed to the action of the pressure in the said shell and slightly movable outwardly under pressure, a longitudinally adjustable retaining ring adapted to retain the head in position, the said ring being tapered inwardly to provide an annular recess between the retaining means and the shell, and a soft metal gasket in the said recess engaging the taper of the retaining ring, the shell and the head, and arranged to be expanded by the action of the said head and retaining ring to form a fluid tight connection.

3. The combination with a shell in which high pressure is normally existent and having an internal annular shoulder, of a head adapted to engage the shoulder and being exposed to the action of the pressure in the said shell and slightly movable outwardly under pressure, the said head being provided with a flat external shoulder, retaining means adapted to retain the head in position, the said retaining means being tapered inwardly to provide an annular recess between the retaining means and the shell, a metal gasket, in the said recess engaging the taper of the retaining means, the shell and the flat external shoulder of the head and arranged to be expanded by the action of the said head and retaining means to form a fluid-tight connection.

4. The combination with a shell in which high pressure is normally existent and having an internal annular shoulder, or a head adapted to engage the shoulder and being exposed to the action of the pressure within the said shell, a longitudinally adjustable retaining ring adapted to retain the head in position, the said ring being provided with an annular groove defining an annular recess between the ring and the shell, a gasket within the said recess and engaging the ring, the head and the shell, and adapted to be expanded by the action of the pressure upon the head and ring, means for exerting pressure upon the ring to counteract the pressure upon the head, and means for longitudinally adjusting the retaining ring.

5. The combination with a shell in which high pressure is normally existent and having an internal annular shoulder, of a head adapted to engage the shoulder and being exposed to the action of the pressure in said shell and slightly movable outwardly under pressure, a retaining ring adapted to retain the head in position, the said ring being tapered inwardly to provide an annular recess between the ring and the shell and a soft metal annular wedge-shaped gasket in the said recess engaging the ring, the head and the shell, and arranged to be expanded by the action of said head and retaining ring to form a fluid-tight connection.

In testimony whereof I affix my signature.

WALTER I. NEVIUS.